INVENTOR.
(Dr.Ing.) JIRI HRDINA

April 28, 1970  J. HRDINA  3,508,837
PHOTOMETRIC CELL FOR OPTICAL MEASUREMENT OF A LIQUID
SECTIONALIZED INTO SAMPLE SEGMENTS BY INTERVENING
SEPARATING PISTONS OF A GAS
Filed Dec. 5, 1966  2 Sheets-Sheet 2

INVENTOR.
(Dr. Ing.) JIŘI HRDINA
BY
Attorney 3,508,837
PHOTOMETRIC CELL FOR OPTICAL MEASUREMENT OF A LIQUID SECTIONALIZED INTO SAMPLE SEGMENTS BY INTERVENING SEPARATING PISTONS OF A GAS
Jiri Hrdina, Prague, Czechoslovakia, assignor to Ceskoslovenska akademie ved, Prague, Czechoslovakia, a corporation of Czechoslovakia
Filed Dec. 5, 1966, Ser. No. 599,153
Claims priority, application Czechoslovakia, Dec. 3, 1965, 7,262/65
Int. Cl. G01n 1/10
U.S. Cl. 356—246                 5 Claims

ABSTRACT OF THE DISCLOSURE

A photometric cell for use in an apparatus for photoelectric measurement of a liquid sectionalized into sample segments by intervening separating pistons of a fluid. The liquid is moved in a stepwise fashion through a capillary feed conduit entering said cell at one end thereof and a discharge tubing attached to the other end of said cell. A retaining chamber is provided at the entrance of said feed conduit into said cell and permits separating pistons entering thereinto and retained therein to substantially spherically extend and to allow the following sample segment of fluidal medium to flow around into and be measured in the cell until a higher flow rate of the liquidal medium forces the separating fluidal piston to move out of the retaining chamber and move toward and away through the discharge tubing.

My invention relates to a method and to means used in laboratory techniques particularly in connection with automatic analyzers for the testing of a liquidal flow passing through a narrow tubing. In such methods and means it is known to divide the flow of a primary fluid moving through narrow, mostly capillary tubings into succeeding sections by means of bubbles or drops from an auxiliary fluidal medium which alternate with and act as pistonlike elements in the tubing and separate the said sections of the primary fluid from each other. The auxiliary fluid can be continuously injected into the flow of the primary liquid and the existing capillary forces form said pistonlike elements which are more or less irregular, though in the average approximately constant, as to their shape and spacing. However, when exactness and effectiveness is required it is necessary that the said separating pistonlike elements have precisely the same size and spacing; this can be achieved by precision pumps which deliver in exactly defined timely intervals exactly equal quantities of the auxiliary fluidal medium into the flow of the primary liquid. But even in such case, particularly if one of the fluids is gaseous or if the walls of the capillary tubing are quite stiff, the positions of the separating fluidal pistonlike elements at the end of the long capillary tubing, during the same phase of their introduction are roughly immovable relative to the tubing and sometimes these positions fluctuate moderately around an average value.

In the treatment or in the evaluation of the flow of a fluidal medium, particularly in flow-through measuring cells of photometers, the presence of said separating fluidal pistonlike elements (hereinafter referred to just as pistons) would, however, impede the process of measuring. Therefore, it is necessary either to eliminate the pistons prior to treatment or evaluation, or to make sure that they pass through the measuring space in the cell only at a time when they do not hinder the measuring process. The second case provides the advantage that the fluidal piston which passes through the cell during individual measurements assures in the cell a very good separation of sections of the primary fluid provided the piston, while passing through the cell closes the flow area and thus continues to act as a separating piston. In any case the moving piston will prevent an undesired expansion of the liquid in the measuring cell as defined by Poiseuille's law namely by expanding in paraboloidal wave surfaces.

It is not desirable to remove the pistons from the flow at a great distance preceding the processing place because at places where the sections of the primary liquid are no longer separated by said pistons they necessarily mix in view of the parabolization under Poiseuille's law, especially as a result of the adhesion between the surface of the fluidal pistons and the walls of the tubing. This undesired effect is particularly increased when after removal of said pistons the fluidal medium has to pass through an enlarged cross-sectional profile of the tubing.

In the known methods and apparatus the dividing fluidal pistons are separated from the primary liquid in a manner not satisfying exact measuring purposes, particularly when the liquid is to be best utilized at desirable operational speeds as for example in modern analyzers for mixtures of amino acids and similar substances. There the separating fluidal pistons either pass together with the primary liquid to be measured through the measuring cell after having been just retarded shortly before the measuring place to avoid that they obstruct the measuring, or the pistons are held back closely before the measuring space and from there removed advantageously intermittently, beyond the cell by a special pump or by pulsating effects acting upon the flow of the primary liquid, for example, coming from separate pumping pulsating means which at the same time assure the desired programmed flow of the primary liquid through the measuring space. The known art does not satisfy the aforesaid demands being content with a separation of the fluidal pistons in separate spaces whereinto the column of alternating mediums freely drops off so that the gaseous phase separates by gravitational effects from the liquid phase which is then carried into the measuring cell. It is also known to separate the fluidal, possibly liquid pistons by carrying the flow of alternating mediums through a separator substantially formed by a T-tube said pistons possibly with a small amount of the primary fluid being sucked off through one arm of said T-tube; the separation is achieved by exploiting the differences of specific gravity, the pistons consisting of a specifically lighter medium escaping through the ascending arm of said T-tube and pistons consisting of a medium specifically heavier than the primary liquid through the descending arm thereof.

The known art satisfies only such less exacting purposes where the mixing of sections of the primary liquid which are not separated by pistons is not only not seriously disadvantageous but to a certain degree is even a welcome provision reducing possible fluctuations of resulting indications.

My invention aims at the elimination of the aforesaid disadvantages and consists therein that said separating fluidal pistons are held back before the functional space of the measuring cell by a contraction of the inner profile of the tubing relative to the non-deformed shape of said pistons at least during the measuring operation and thereafter drained away. However, the separating fluidal pistons can be forced, while the primary liquid in said functional space is not being measured, by the pulsation of the delivering means through said functional measuring space of the cell to clean its walls; the separating fluidal pistons may also be drained off from said contraction directly into a refuse container without passing through said functional measuring space of the cell. In principle my invention provides before the said functional measuring space a retaining chamber having an outlet profile at least in one dimension smaller than the diameter of the said fluidal separating pistons shaped by their surface tensions; advantageously a collecting chamber is arranged behind said functional measuring space of the cell, seen in the direction of the flow of the primary liquid. The outlet profile of said retaining chamber may be changed by control means movable transversely to the direction of the fluidal flow; a draining channel by passing the functional measuring space of the cell may connect the retaining chamber with the refuse container.

The said and other objects of my invention will be more fully understood from the following specification when read with the accompanying drawing wherein FIG. 1 shows a longitudinal sectional view of a through-flow measuring cell, which includes the retaining chamber for the separating fluidal pistons and feeding and outlet tubings;

The same reference numbers indicate the same or equivalent elements in all figures.

Figure 1:
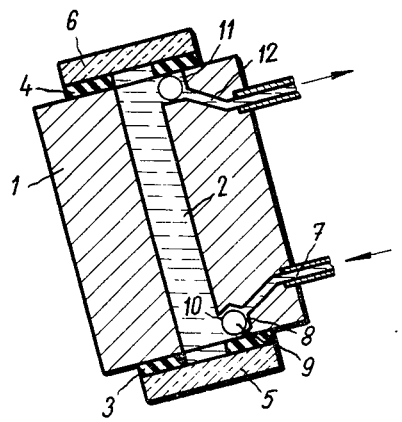
Figure 2:
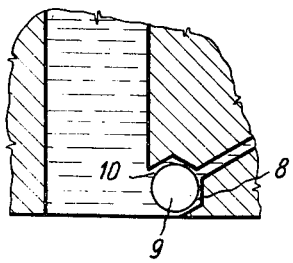
FIG. 2 shows a detail of said sectional view.

FIG. 1 illustrates a flow-through photometer measuring cell 1 with a functional space 2 in the form of a capillary bore-hole which is at each end closed by a transparent lid 5 and 6, respectively; each lid rests upon an elastic gasket 3 or 4, and is tightened to the body of the cell in customary manner by not shown flanges and screws. The column of the primary liquid sectionalized by separating fluidal pistons 9 i.e. drops or bubbles of an auxiliary fluid is fed into the cell space 2 by the capillary tubing 7 which terminates in an enlarged chamber 8 adapted to receive securely one of said separating bubbles 9 or the like. The chamber 8, in which the separating bubble 9 is held back, is so shaped and dimensioned that the bubble 9 can assume a substantially spherical shape leaving, however, some clearance, particularly in the corners of the chamber so that the primary liquid can continue to flow around the bubble without entraining the same as long as the velocity of flow is sufficiently small or even zero during a retardation of the working cycle of the not shown periodically operating pumping means which move the liquid or the column composed of sections of the liquid and of separating pistons. The discharge opening 10 of the chamber 8 into the functional space 2 of the cell is so formed and dimensioned that the passage of the bubble 9 therethrough is conditioned upon its deformation against the capillary forces which tend to maintain the radius of the curvature of the surface of the bubble at a minimum; accordingly, the bubble 9 will not pass through the partially obstructing discharge opening 10 (see FIG. 2) as long as the hydraulic forces acting upon it, possibly in combination with hydrostatic forces resulting from differences of specific weights, do not acquire at an increased velocity of flow a value sufficient to deform the bubble 9 and to let it pass through opening 10 into the functional space 2 together with the fluid flowing around it. The forces which push bubble 9 from the chamber 8 through opening 10 are dependent on the passage areas left around the bubble and on the velocity of flow. A sufficiently increased velocity of flow caused by the operational pulse of pumping or similar means for moving the fluid will dislodge the bubble from chamber 8 into the functional space 2. If the size of bubble 9 and the clearance of the functional space 2 conform, the bubble while passing therethrough acts as a piston completely closing said clearance and separates sections of the flowing liquid; it also cleans the walls within the space 2. However, even if the bubble 9 does not completely close the clearance of space 2 it will still adequately work in the before indicated manner and in any case cause a mixing of the content of space 2 and prevent the undesirable paraboloidal expansion of the liquid defined in Poiseuille's law which expansion can be the source of considerable errors in the evaluation of photometric indications in a flow-through measuring cell. After passing the functional space 2 the bubble 9 reaches the chamber 11 in front of the discharge tubing 12, and leaves the cell therethrough together with the sections of the primary liquid. The described action is the result of the combined effects of surface tensions and of the flow of the fluid and it is independent from the spatial position of the cell; said action will therefore also be accomplished if the longitudinal axis of space 2 and the tubings 7 and 12 are, for example, horizontal, in which case FIG. 1 would represent a horizontal section through the cell. It is also possible to utilize forces resulting from the difference in the specific weights of the bubble 9 and the primary liquid, so that the buoyancy of the bubble would support the mentioned effects; in such case the longitudinal axis of space 2 would slant upwards as shown in the vertical sectional view of FIG. 1.

Advantageously the size and/or shape of the passageway connecting the chamber 8 from adjoining spaces are made regulatable.

Figure 3:
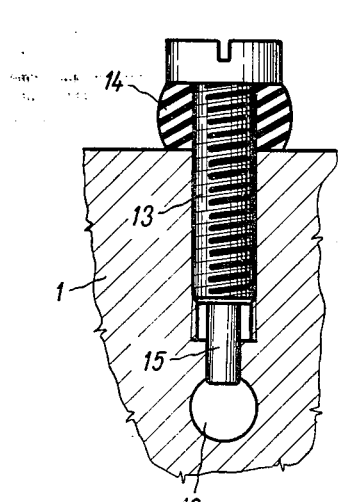
FIG. 3 shows regulating means to control the profile of the outlet of the retaining chamber.

FIG. 3 illustrates schematically an embodiment of such regulating means. The same consists of an adjusting screw 13 screwed into the body of cell 1, said screw being tightened by an elastic gasket 14 and having a diametrically reduced end portion 15 adapted to enter and to control the passageway 16.

Figure 4:
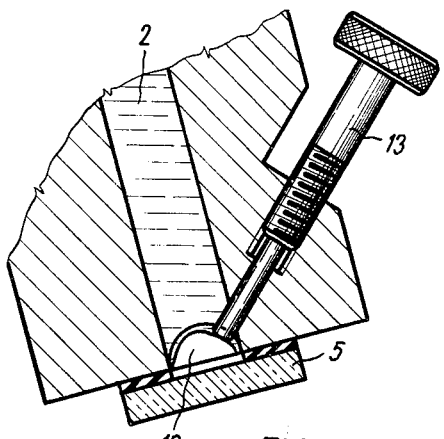
FIG. 4 illustrates the application of the aforesaid regulating means to a measuring cell shown in FIG. 1.

FIG. 4 illustrates the application of the regulating means shown in FIG. 3 for control of the passage 10 in the embodiment shown in FIG. 1.

Figure 5:
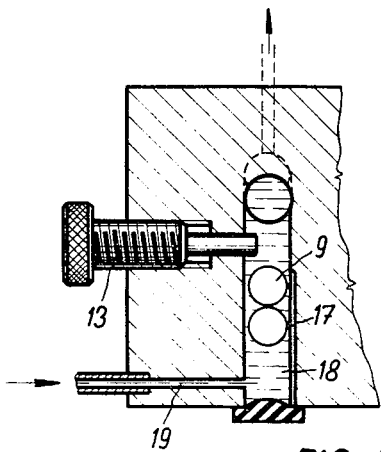
FIGS. 5 and 6 illustrate other applications of said regulating means.

FIG. 5 illustrates schematically in cross-section the before described regulating device applied to the retaining chamber 8. The adjusting screw 13 regulatably limits the profile through which the bubble 9 has to pass. The primary liquid can flow around and beyond one or more bubbles 9 through the by-pass channel or groove 17 into the cylindrical duct 18 into which the inlet tubing 19 leads and which is closed by a sealing plug 20.

Figure 6:
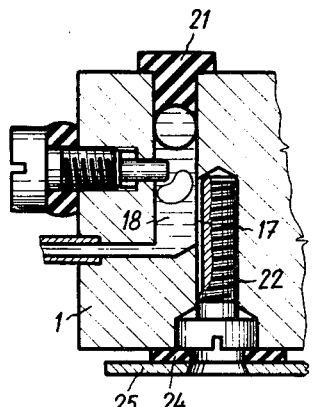

FIG. 6 shows schematically an embodiment similar to that shown in FIG. 5. In this case the duct 18 is drilled into the cell body 1 from above and is closed by plug 21. The bolt 22 extends into the space 18 or its lateral extension and is provided with a laterally extending groove 17 which can be regulated by turning bolt 22. The bolt 22 may be provided with a plurality of possibly differently sized grooves 17 in which case the regulation is effected by so turning the bolt that differently sized grooves communicate with the space, or that only a part of the profile of the groove opens towards space 18. The bolt 22 is sealed towards the outside by the gasket 24 held by the flange 25 and by not shown screws engaging the body of cell 1.

Figure 7:
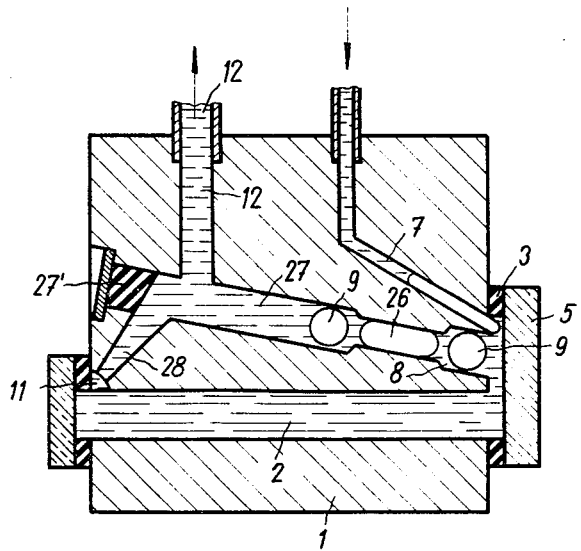
FIG. 7 shows another embodiment of the measuring cell.

FIG. 7 illustrates schematically an embodiment of the measuring cell 1 where the bubbles 9 are drained from the retaining chamber 8 by passing the functional space 2. This is achieved by the duct constriction 26 which connects said chamber 8 with the wider duct 27 and with the outlet tubing 12. The plug 27' closes the bore-hole through which the duct 27 is drilled. The bubbles 9 are held back in the chamber 8 which permits a reduction of their spherical shapes; they remain in said chamber while the primary liquid flows into the functional space 2 of the cell.

While specific embodiments of my invention have been shown and described to illustrate the application of the principles of my invention, it will be understood that the same may be otherwise embodied without departing from such principles.

What I claim as my invention is:

1. In an apparatus for photoelectric measurement of a liquidal medium sectionalized into sample segments by intervening separating pistons of a fluidal medium which move in response to the rate of flow of the liquidal medium, the improvement comprising in combination:
   (a) a photometric cell having a longitudinal substantially cylindrical boring constituting the operational space for traversing measuring rays;
   (b) a transparent lid closing each end of said boring;
   (c) a capillary feed conduit entering said boring at one end thereof and a discharge tubing attached to the other end of said boring said feed conduit stepwise carrying succeeding sample segments of the liquidal medium to be measured into said boring;
   (d) and a retaining chamber adjacent the entrance of said feed conduit, said chamber communication between said feed conduit and said boring, thereby permitting separating pistons entering said chamber to be retained therein in substantially spherical shape and to allow the following sample segment of fluidal medium to flow around said pistons into and be measured in the boring at said low flow rate, the piston being ejected into the boring at a higher flow rate.

2. In an apparatus for photoelectric measurement of a liquidal medium according to claim 1 wherein the retaining chamber includes a partially obstructing discharge opening, whereby deformation of said piston is necessary before passing through said opening.

3. In an apparatus for photoelectric measurement of a liquidal medium according to claim 1 including a collecting chamber for the outgoing piston in front of the discharge tubing.

4. In an apparatus for photoelectric measurement of a liquidal medium according to claim 1 including a channel by-passing the boring and connecting the retaining chamber with the discharge tubing.

5. In an apparatus for photoelectric measurement of a liquidal medium according to claim 1 including an adjusting element for the cross-section of the outlet of the retaining chamber to control the release of the retained piston.

References Cited

UNITED STATES PATENTS

| | | | |
|---|---|---|---|
| 3,046,831 | 7/1962 | Isreeli | 356—246 X |
| 3,323,362 | 6/1967 | Wells | 73—194 |

S. CLEMENT SWISHER, Primary Examiner